Figure 1:
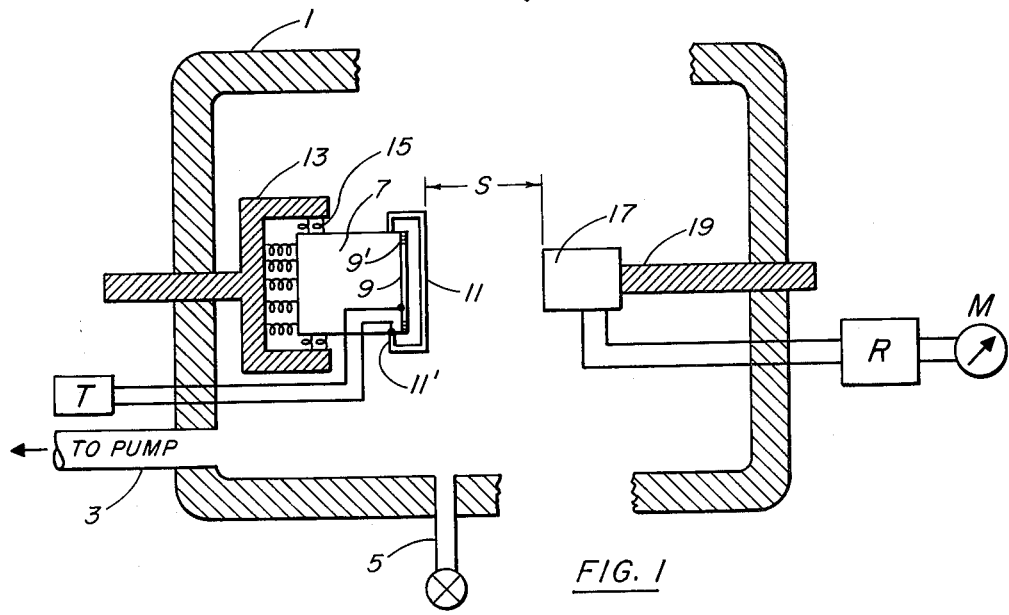

Feb. 8, 1966   M. A. HECKL ETAL   3,233,461
METHOD OF AND APPARATUS FOR MEASURING PRESSURE AND DENSITY
Filed May 23, 1962

MANFRED ANTON HECKL
GIDEON MAIDANIK
INVENTORS

BY Rines and Rines
ATTORNEYS

United States Patent Office 3,233,461
Patented Feb. 8, 1966

3,233,461
METHOD OF AND APPARATUS FOR MEASURING PRESSURE AND DENSITY
Manfred Anton Heckl, Newton, and Gideon Maidanik, Waltham, Mass., assignors to Bolt, Beranek and Newman, Inc., Cambridge, Mass., a corporation of Massachusetts
Filed May 23, 1962, Ser. No. 197,155
8 Claims. (Cl. 73—388)

The present invention relates to pressure and density measuring methods and apparatus and, more specifically, to the measurement of the pressure of gaseous and similar media, all hereinafter generically referred to as gaseous media, and over wide pressure ranges.

Numerous types of vacuum or other pressure gages have been evolved and employed throughout the years for measuring a variety of pressure ranges of gaseous and other media. Unfortunately, however, none of the previous techniques have enabled the use of a single instrument for very wide-range pressure measurements including, for example, measurements extending from substantially atmospheric pressure down to $10^{-5}$ millimeters of mercury or less. Mechanical diaphragm gages, for example, are limited to the measurement of pressure ranges down to about 0.2 of a millimeter or so; whereas Pirani gages, operating upon the principle of measuring heat conduction, are not only limited to pressures of the order of one-thousandth of a millimeter of mercury, but inherently involve a time delay in effecting the measurement. Such time delays are also inherent in thermocouple gages which, moreover, are relatively insensitive and inaccurate devices. Ionization gages, on the other hand, can only measure pressures as high as about one-tenth of a millimeter of mercury or so, and, at their upper range of measure are not very accurate. In addition, ionization gages have an inherent time delay of measurement and involve out-gassing problems inherent in the introduction of foreign gas molecules or radioactive tracers or the like.

An object of the present invention, accordingly, is to provide a new and improved method of and apparatus for measuring pressure and/or density that shall not be subject to the narrow-range, time delay, out-gassing, and other limitations of prior-art gages above discussed; but that it, to the contrary, provides a wide-range pressure gage that is substantially instantaneous in its response.

A further object is to provide such a pressure-measuring apparatus that operates with acoustic-wave energy and that introduces minimal disturbance into a process of other system, as distinguished from the necessity, in prior-art systems, for introducing heating or foreign gaseous or other ions or molecules.

Still another object is to provide a new and improved wide-band pressure-measuring apparatus that may readily be calibrated either from atmospheric pressure measurements in air, or from other standard measurements, and that is inherently void of parts that can wear out or become inaccurate with long periods for use.

In summary, from one of its broadest aspects, the invention involves the transmitting of acoustic waves of predetermined wavelength from a first region in contact with a gaseous medium along a predetermined path through the medium; receiving the transmitting waves at a second region in contact with the medium and displaced along the said path from the first region a distance less than the said predetermined wavelength; varying the pressure of the gaseous medium; and indicating the amplitude of the received waves to provide a measure of the said pressure. Preferred constructional details are hereinafter described.

Other and further objects will be explained hereinafter and will be more particularly pointed out in connection with the appended claims.

Figure 2:
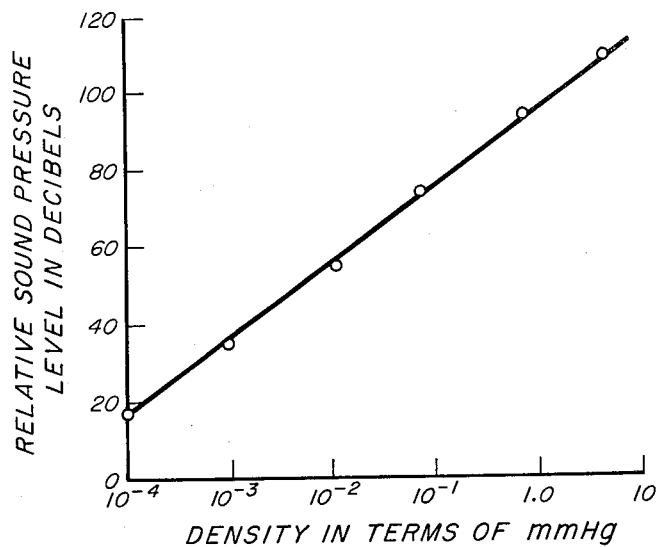

The invention will now be described in connection with the accompanying drawing, FIG. 1 of which is a combined longitudinal section and schematic diagram of an apparatus operating in accordance with the method underlying the present invention and constructed in preferred form; and FIG. 2 is a graph of experimentally obtained results demonstrating the novel wide-range characteristics of the pressure apparatus of the present invention.

Referring to FIG. 1, a chamber 1 is shown provided with an outlet 3 that enables the pressurizing of the medium within the chamber 1, as by connection to a diffusion pump or other evacuating or pressurizing system, symbolically labeled "pump." A valve-controlled inlet 5 is shown provided within the walls of the chamber 1 to enable the introducing of a gaseous medium or the like into the interior of the chamber 1.

Mounted within the chamber 1 is an acoustic-wave transmitting member or transducer 7, shown as of the electrostatic vibrator type, comprising a pair of electrostatically coupled diaphragms, plates or electrodes 9 and 11, as is well known. The transmitting member 7 may be excited from an electric oscillator of predetermined frequency or wavelength, shown at T. The mounting structure 13 for the transmitting member 7 is supported by the chamber wall 1, but is isolated mechanically from the vibrations of the member 7, as by means of resilient springs 15 or the like, for a reason later explained.

A receiving acoustic-wave transducer 17, such as a microphone or the like, which may be identical to the transmitter 7 in order to provide interchangeable use as a transmitter, is mounted at 19 within the chamber 1 a predetermined distance S along a horizontal path from the region occupied by the outer plate 11 of the transmitter member 7. The receiving transducer 17 is shown connected to receiving-and-amplifying apparatus R which, in turn, is connected to any desired indicator, schematically shown as a meter M, for measuring the amplitude of the received acoustic-wave signal.

It has been discovered that vibrations of the transmitting surface 11 will impart an alternating-current component of momentum flux to the gaseous molecules with which it comes in contact or interacts. This may be detected at the receiver 17, and the amplitude of the received signal, over a very wide range of pressures, is a measure of the density of the gas molecules and hence of the pressure of the gaseous medium within the chamber 1. This opeartion, however, requires that the wavelength of the acoustic oscillations transmitted at 11 be greater than the distance S separating the transmitting member 7 from the receiving member 17; and while the said distance S may be less than the mean free path of the gas molecules over the pressure range of interest, this has found not to be a requirement.

With, for example, a fixed oscillation frequency of 10 kilocycles, and a separation S of the order of a few millimeters, from about 1 to 5 millimeters, pressure measurements have been successfully made (by indicating the amplitude of the received signal at 17) from atmospheric pressure, at which the system may be stabilized or calibrated (as by setting the indicator M to a predetermined value for measurement of the reecived amplitude at atmospheric pressure) down to at least the order of $10^{-5}$ millimeters of mercury. By making the microphone or other receiver 17 and/or the transmitter resonant, preferably with a feed-back control to the oscillator T, as is well known, more sensitive pressure detection down to the order of $10^{-7}$ millimeters of mercury may be obtained.

Since, particularly at the low pressures where the gas is rarified, the acoustic signal is weak, it is important that both the mechanical and electromagnetic interaction or cross-talk between the transmitter 7 and the receiver 17 be prevented. The previously mentioned resilient members 15 aid in preventing mechanical coupling through the walls of the chamber 1, so that acoustic vibrations proceed only along the horizontal path S. Electromagnetic isolation may be achieved by causing the outer plate or surface 11 to serve as an electromagnetic shield, as indicated by the surrounding configuration at 11'. Another factor contributing to the prevention of mechanical coupling to the receiver, other than by the path S, resides in the preferable utilization of an outer vibrating surface 11 that is a thin conductive foil of little mass. Experimental apparatus of this type has involved a thin circular aluminum plate about 4½ centimeters in radius.

The experimental curve of FIG. 2 was obtained with a system like that shown in FIG. 1, for an oscillation frequency of six kilocycles and a separation S of 3.5 millimeters, the gaseous medium being air. The ordinate plots the detected sound-pressure level in decibels, and the abscissa plots the pressure in millimeters of mercury. The noise level was below −20 db. This was checked against a standard ionization gage (for a pressure range from $10^{-4}$ to $10^{-2}$ mm.) and an "alpha"-tron gage (for a pressure range from $7 \times 10^{-3}$ to 7 mm.).

Clearly, other types of transmitting and receiving transducers may be employed, as may other types of indicators or meters M. It is preferred, however, that the receiver circuit R include a narrow filter for extracting the frequency of the transmitted waves in order to reduce noise.

Further modifications will occur to those skilled in the art and all such are considered to fall within the spirit and scope of the invention as described in the appended claims.

What is claimed is:

1. A method of measuring the pressure of a gaseous medium over a pressure range from substantially atmospheric to substantially $10^{-5}$ mm. of mercury or less, that comprises, transmitting acoustic waves of predetermined wavelength from a first region in contact with the gaseous medium along a predetermined path through the medium, receiving the transmitted waves at a second region in contact with the medium and displaced along the said path from the first region a distance of the order of or less than $\frac{1}{10}$ of the said predetermined wavelength, and indicating the amplitude of the received waves to provide a measure of the said pressure.

2. The method of claim 1, said distance of displacement of the second region from the first region being less than the mean free path of the gaseous medium within the said pressure range.

3. Apparatus for measuring the pressure of a gaseous medium over a pressure range from substantially atmospheric to substantially $10^{-5}$ mm. of mercury or less, having in combination, a chamber for containing the gaseous medium, means for introducing the gaseous medium into the chamber, means for enabling the pressurizing of the gaseous medium within the chamber, an acoustic-wave-transmitting member mounted within the chamber, an acoustic-wave-receiving member mounted within the chamber a predetermined distance from the transmitting member, means for exciting the transmitting member to transmit to the receiving member acoustic waves of wavelength at least of the order of ten times greater than the said predetermined distance, and means for indicating the amplitude of the waves received by the receiving member to provide a measure of the pressure of the gaseous medium within the chamber.

4. The apparatus of claim 3, further comprising means for mechanically isolating the transmitting member from the chamber.

5. The apparatus of claim 3, wherein said means for exciting the transmitting member comprises electrical oscillation-producing means, and means for electromagnetically shielding the transmitting member from the receiving member.

6. The apparatus of claim 3, in which the said distance is within the range from substantially 1 to substantially 5 millimeters.

7. The apparatus of claim 3, in which at least one of the transmitting and receiving members is adjusted to be mechanically resonant at said wavelength.

8. The apparatus of claim 3, wherein said chamber is substantially wider than the width of said transmitting and receiving members over said distance.

References Cited by the Examiner
UNITED STATES PATENTS
3,019,656  2/1962  Millar _____ 73—398

LOUIS R. PRINCE, *Primary Examiner.*

JOSEPH P. STRIZAK, RICHARD C. QUEISSER,
*Examiners.*